(12) United States Patent
Yamai et al.

(10) Patent No.: US 8,395,874 B2
(45) Date of Patent: *Mar. 12, 2013

(54) MULTIPHASE CURRENT SUPPLYING CIRCUIT, DRIVING APPARATUS, COMPRESSOR, AND AIR CONDITIONER

(75) Inventors: Hiroyuki Yamai, Shiga (JP); Morimitsu Sekimoto, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 879 days.

This patent is subject to a terminal disclaimer.

(21) Appl. No.: 11/792,534

(22) PCT Filed: Nov. 16, 2005

(86) PCT No.: PCT/JP2005/021038
§ 371 (c)(1),
(2), (4) Date: Jan. 7, 2008

(87) PCT Pub. No.: WO2006/061977
PCT Pub. Date: Jun. 15, 2006

(65) Prior Publication Data
US 2008/0104983 A1 May 8, 2008

(30) Foreign Application Priority Data
Dec. 9, 2004 (JP) ................................. 2004-356973

(51) Int. Cl.
*H02H 3/22* (2006.01)
(52) U.S. Cl. ...................................................... 361/111
(58) Field of Classification Search .................... 361/111
See application file for complete search history.

(56) References Cited

U.S. PATENT DOCUMENTS

| 3,793,535 | A | * | 2/1974 | Chowdhuri | ............... 361/111 |
| 4,331,994 | A | * | 5/1982 | Wirth | ............... 361/56 |
| 4,647,438 | A | | 3/1987 | Sabot et al. | |

(Continued)

FOREIGN PATENT DOCUMENTS

| JP | 3-106881 U | 11/1991 |
| JP | 05-316745 A | 11/1993 |

(Continued)

OTHER PUBLICATIONS

Isao Takahashi, The Institute of Electrical Engineers of Japan, National Conference, "Inverter Controlling Method using PM Motor having High-Input-Power-Factor Diode Rectifier Circuit (Improved Power Factor Rectifier Circuit for Inverter Controlled PM Motor)", 4-149, p. 1591, (Mar. 2002).

*Primary Examiner* — Rexford Barnie
*Assistant Examiner* — Ann Hoang
(74) *Attorney, Agent, or Firm* — Birch, Stewart, Kolasch & Birch, LLP

(57) ABSTRACT

A multiphase current supplying circuit according to the present invention includes a diode bridge, an intervening circuit, an inverter, a control circuit, and a lightning arrester. The diode bridge is connected to a single-phase AC power supply system via the lightning arrester, and performs full-wave rectification on a single-phase AC voltage. The intervening circuit includes a capacitor and an inductor, and is constituted by a choke input type low-pass filter. More specifically, one end of the inductor and one end of the capacitor are connected, output from the diode bridge is received between the other end of the inductor and the other end of the capacitor, and a rectified voltage generated at both ends of the capacitor is output to the inverter.

16 Claims, 16 Drawing Sheets

U.S. PATENT DOCUMENTS

| | | | |
|---|---|---|---|
| 4,788,485 A * | 11/1988 | Kawagishi et al. | 318/811 |
| 5,392,188 A * | 2/1995 | Epstein | 361/118 |
| 5,566,060 A * | 10/1996 | Shimer et al. | 363/65 |
| 5,572,397 A * | 11/1996 | Smith et al. | 361/119 |
| 5,982,646 A | 11/1999 | Lyons et al. | |
| 6,049,185 A * | 4/2000 | Ikeda | 318/442 |
| 6,737,822 B2 * | 5/2004 | King | 318/375 |
| 7,095,208 B2 | 8/2006 | Kawaji et al. | |
| 2002/0125837 A1 | 9/2002 | Noda et al. | |
| 2004/0232863 A1 | 11/2004 | Takahashi et al. | |

FOREIGN PATENT DOCUMENTS

| | | |
|---|---|---|
| JP | 6-39270 U | 5/1994 |
| JP | 6-209574 A | 7/1994 |
| JP | 06209574 A * | 7/1994 |
| JP | 8-280173 A | 10/1996 |
| JP | 9-98576 A | 4/1997 |
| JP | 10-136674 A | 5/1998 |
| JP | 10-311646 A | 11/1998 |
| JP | 2001-145258 A | 5/2001 |
| JP | 2001-204173 A | 7/2001 |
| JP | 2002-354826 A | 12/2002 |
| JP | 2003-17287 A | 1/2003 |
| JP | 2004-289985 A | 10/2004 |
| KR | 10-1991-0008928 | 10/1991 |
| KR | 10-2004-0088356 A | 10/2004 |

* cited by examiner

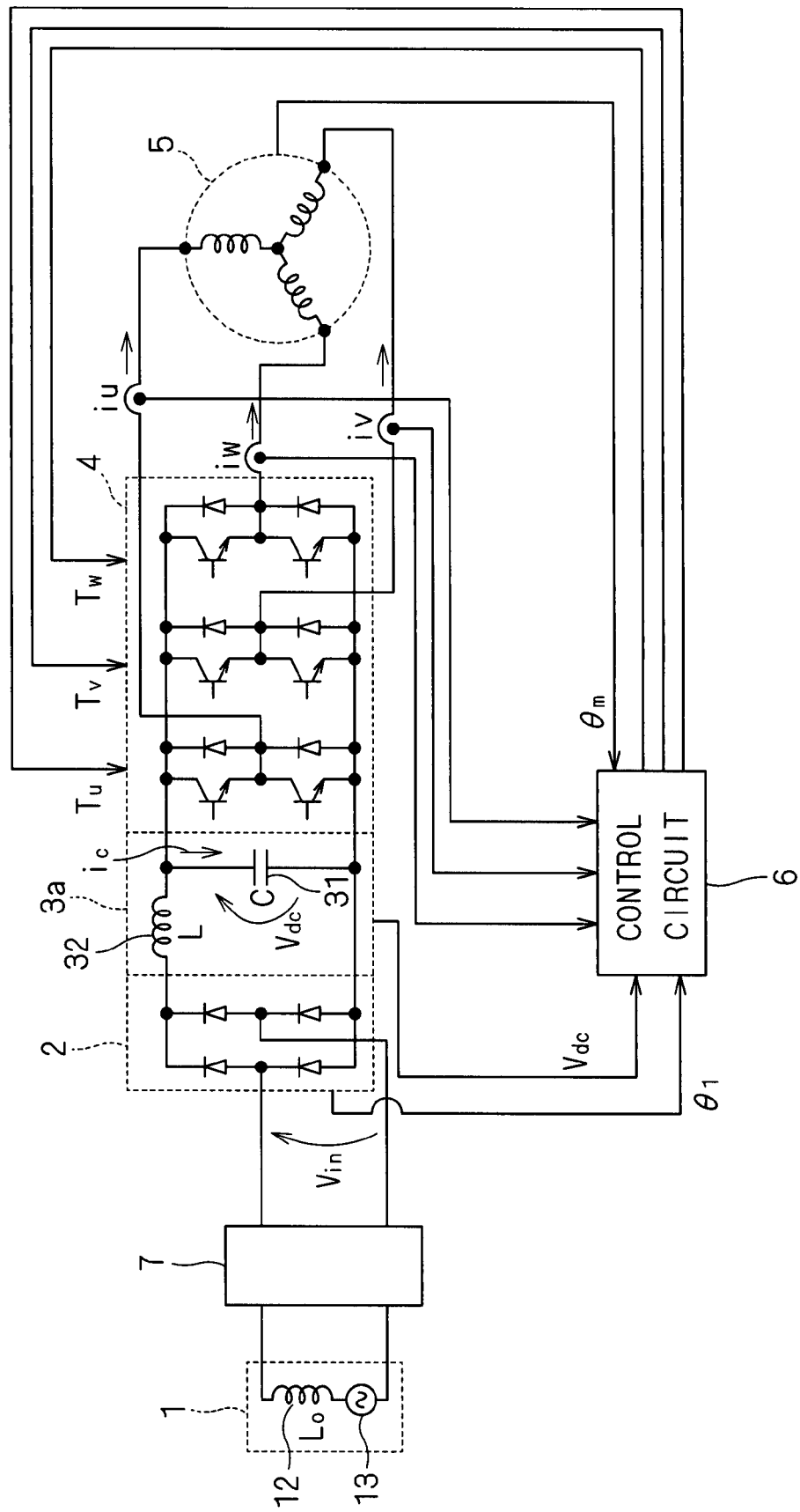
F I G . 1

F I G . 5
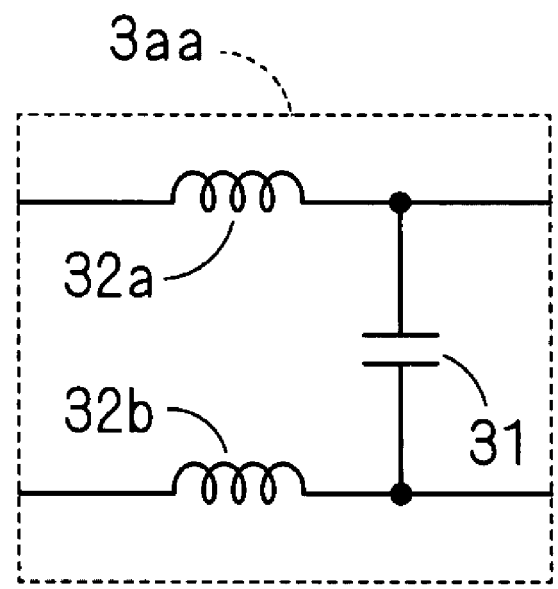

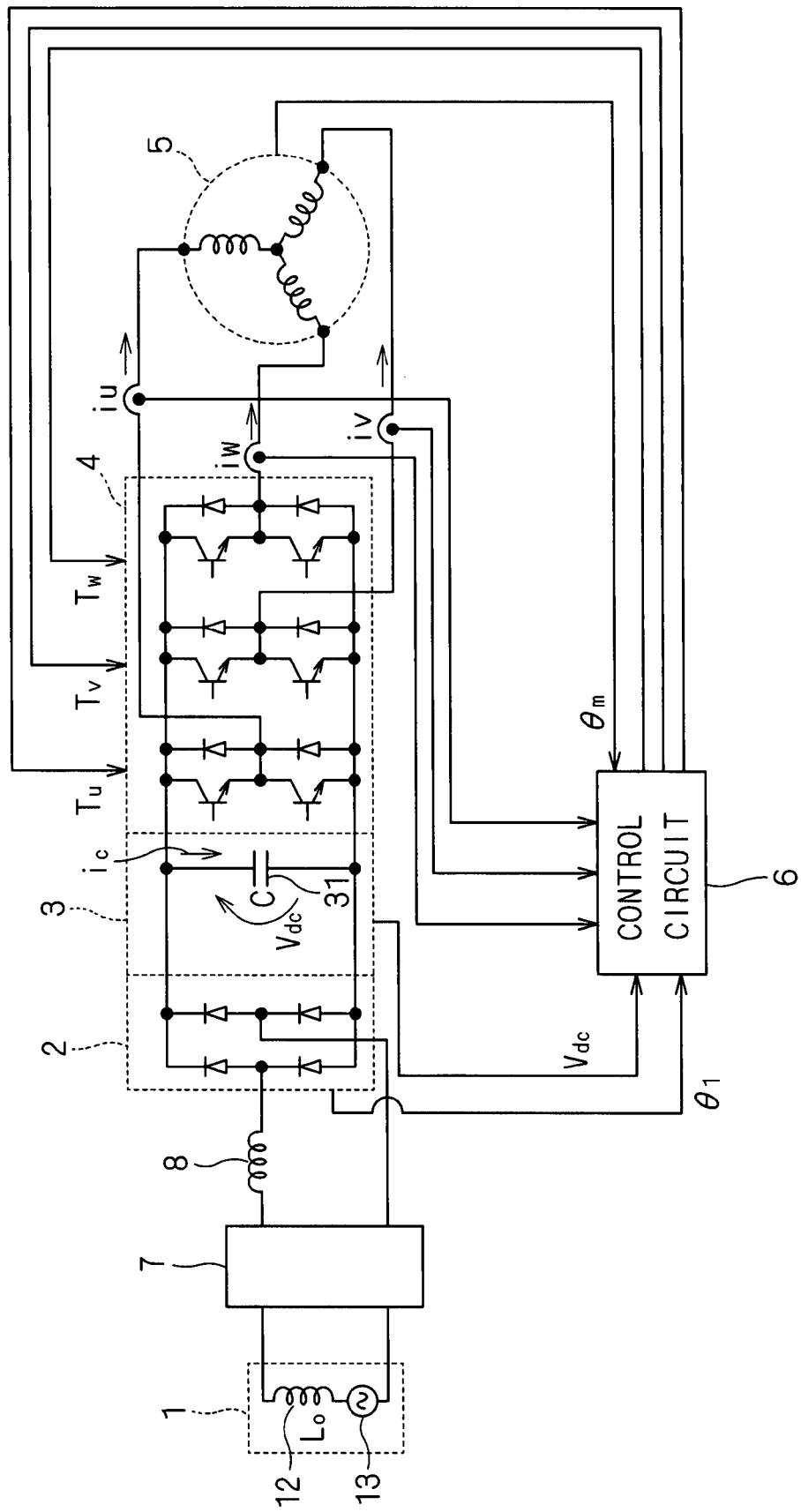
F I G. 6

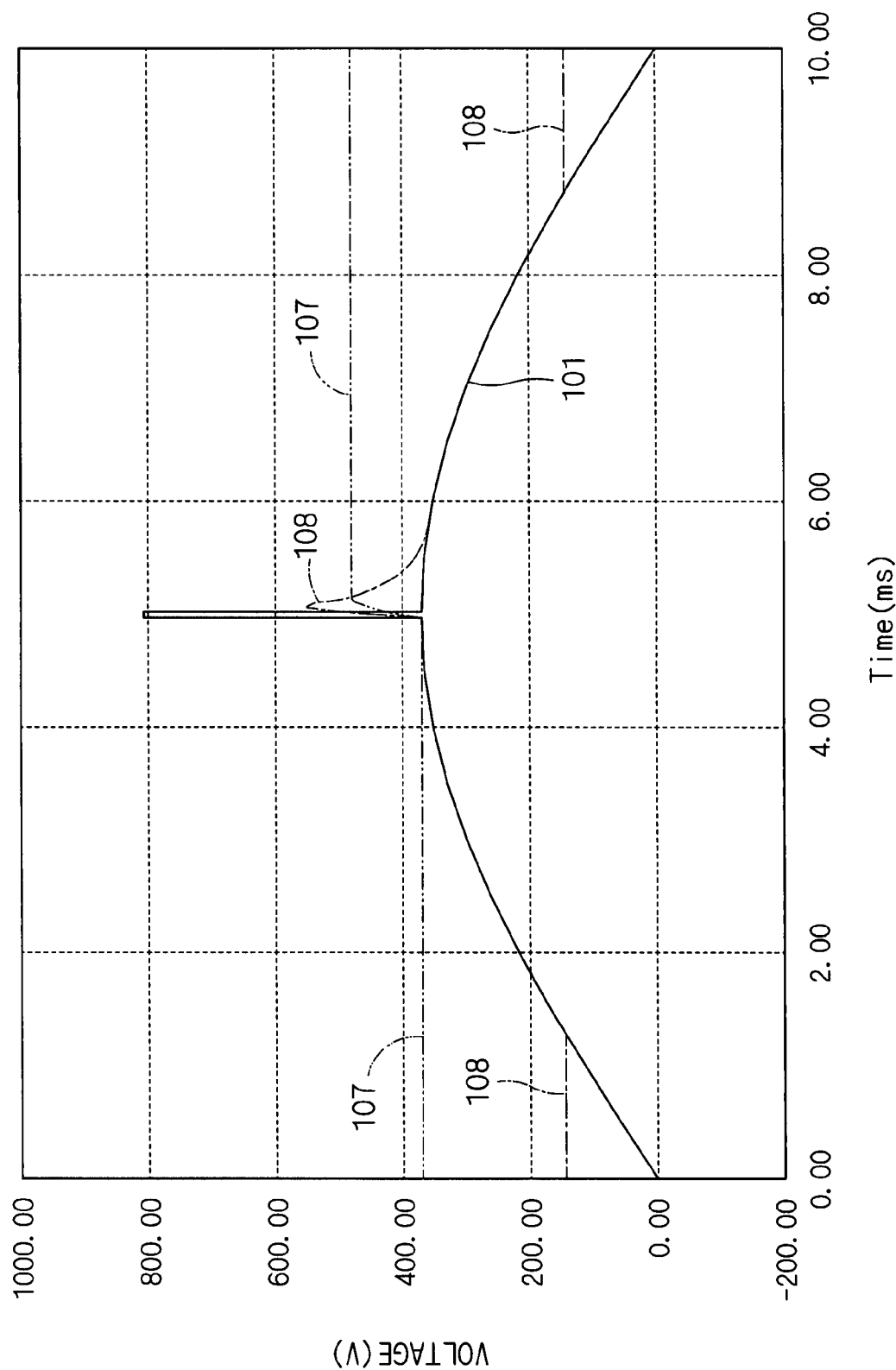

F I G . 1 0
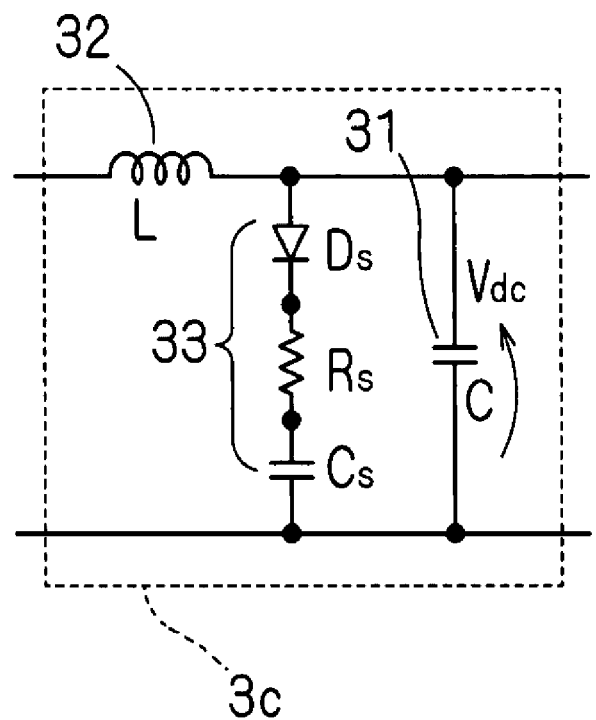

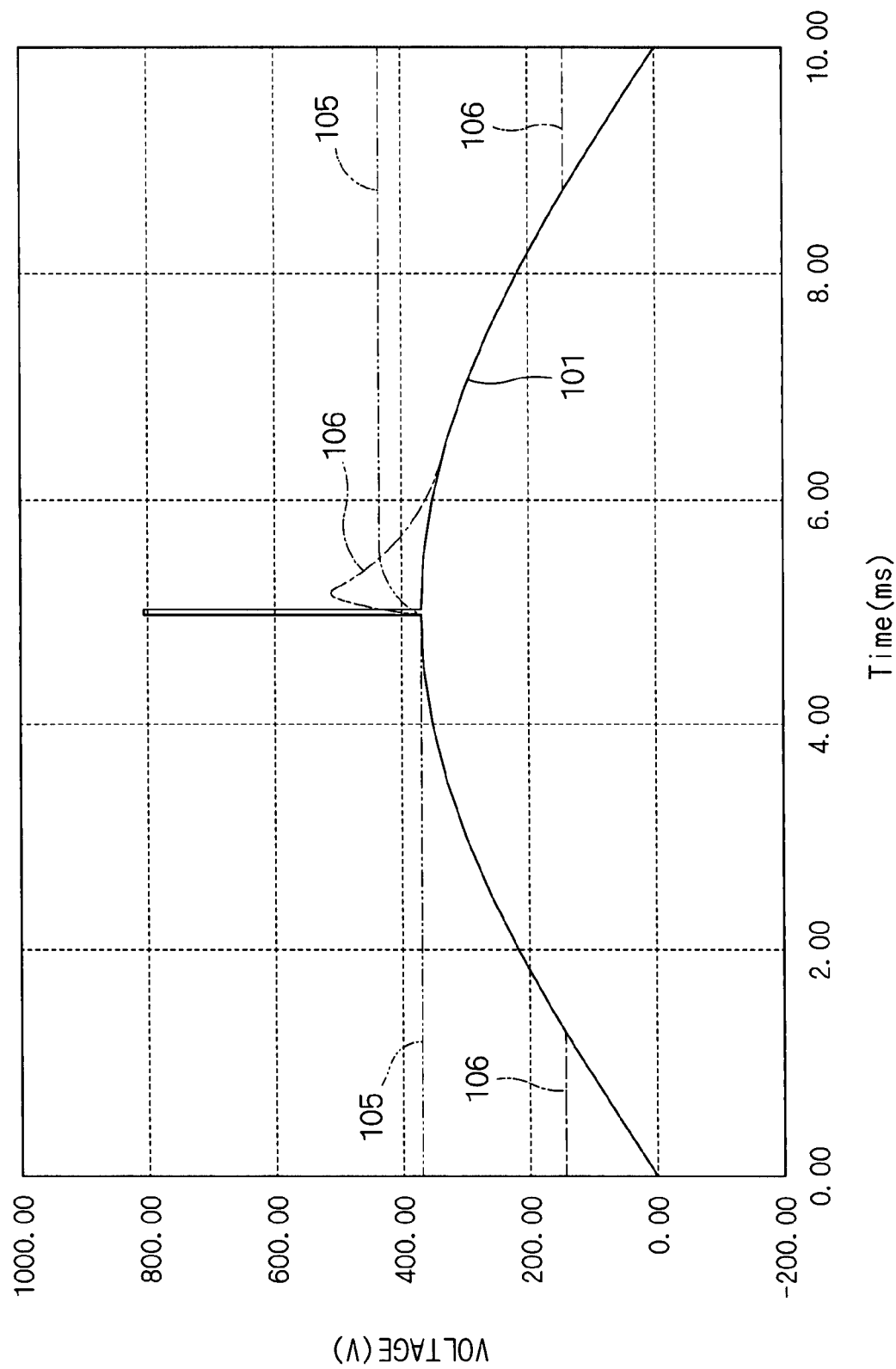

F I G . 1 2
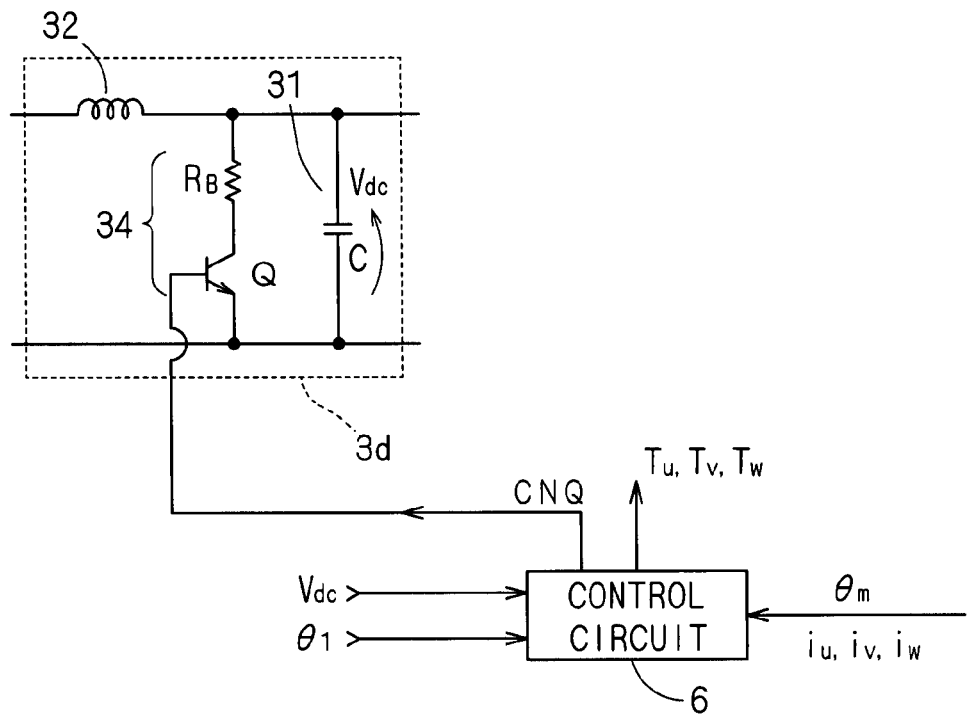
F I G . 1 3
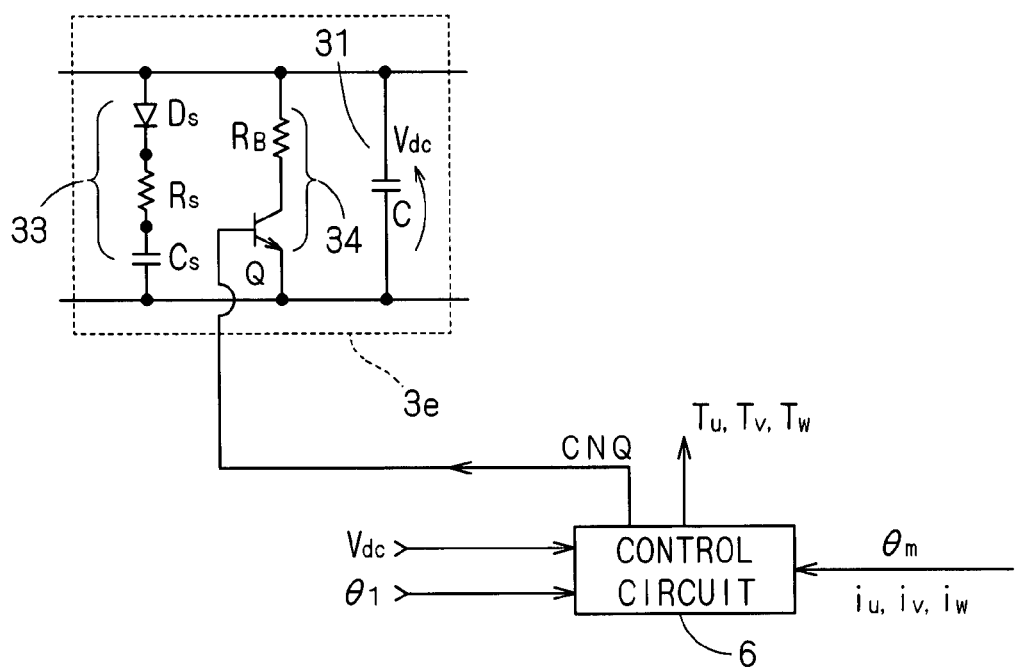

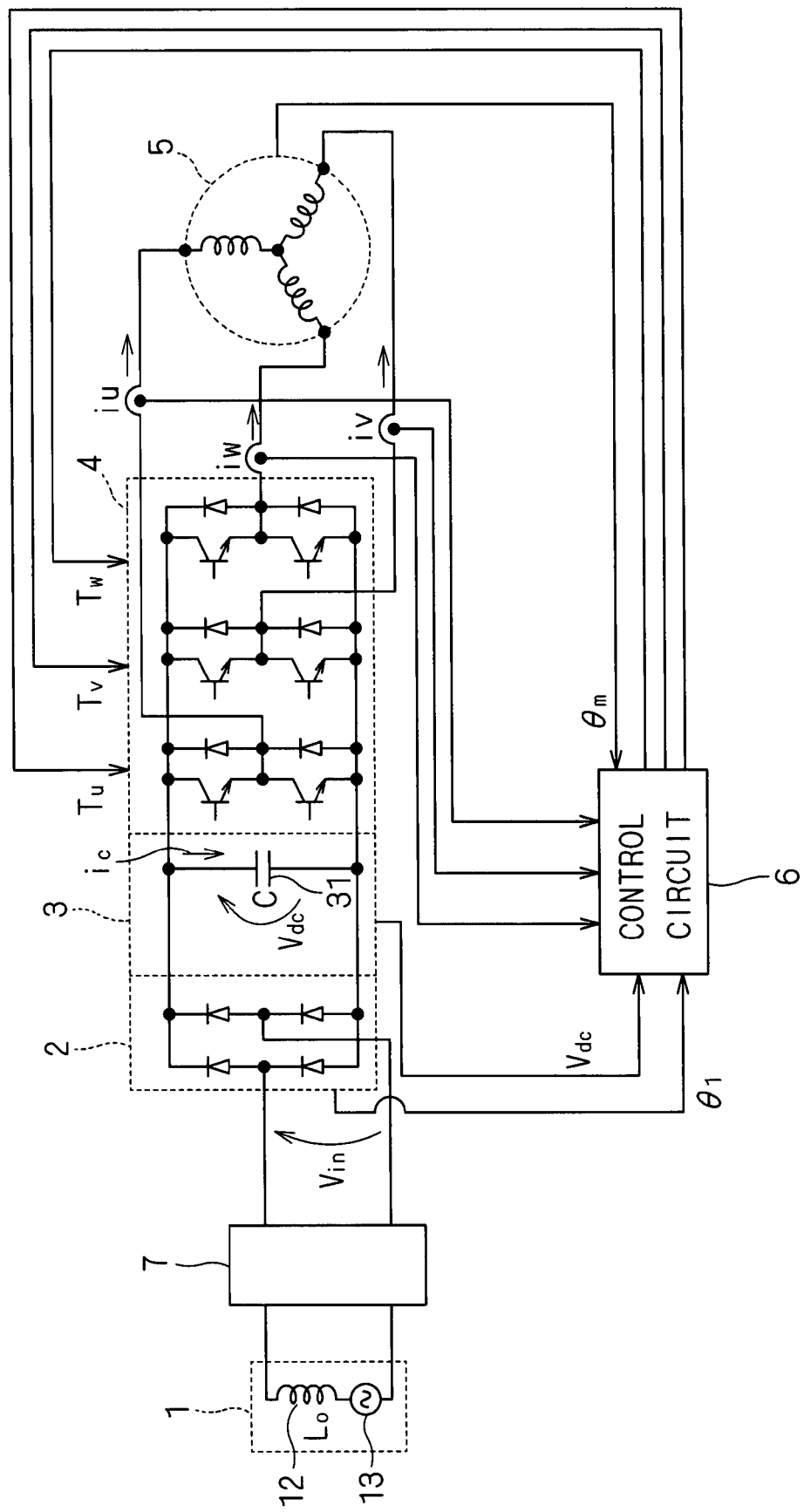
F I G. 1 7

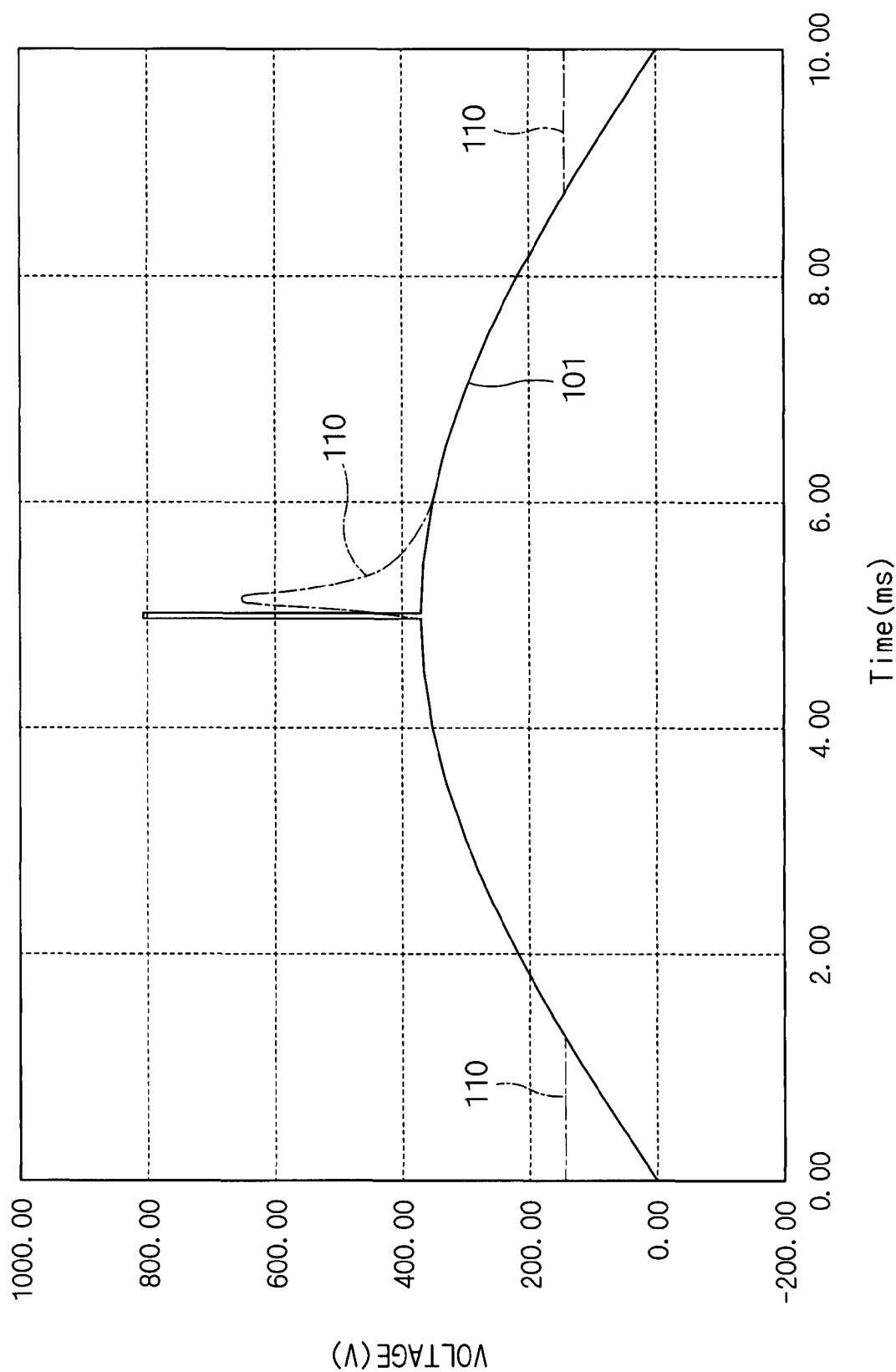

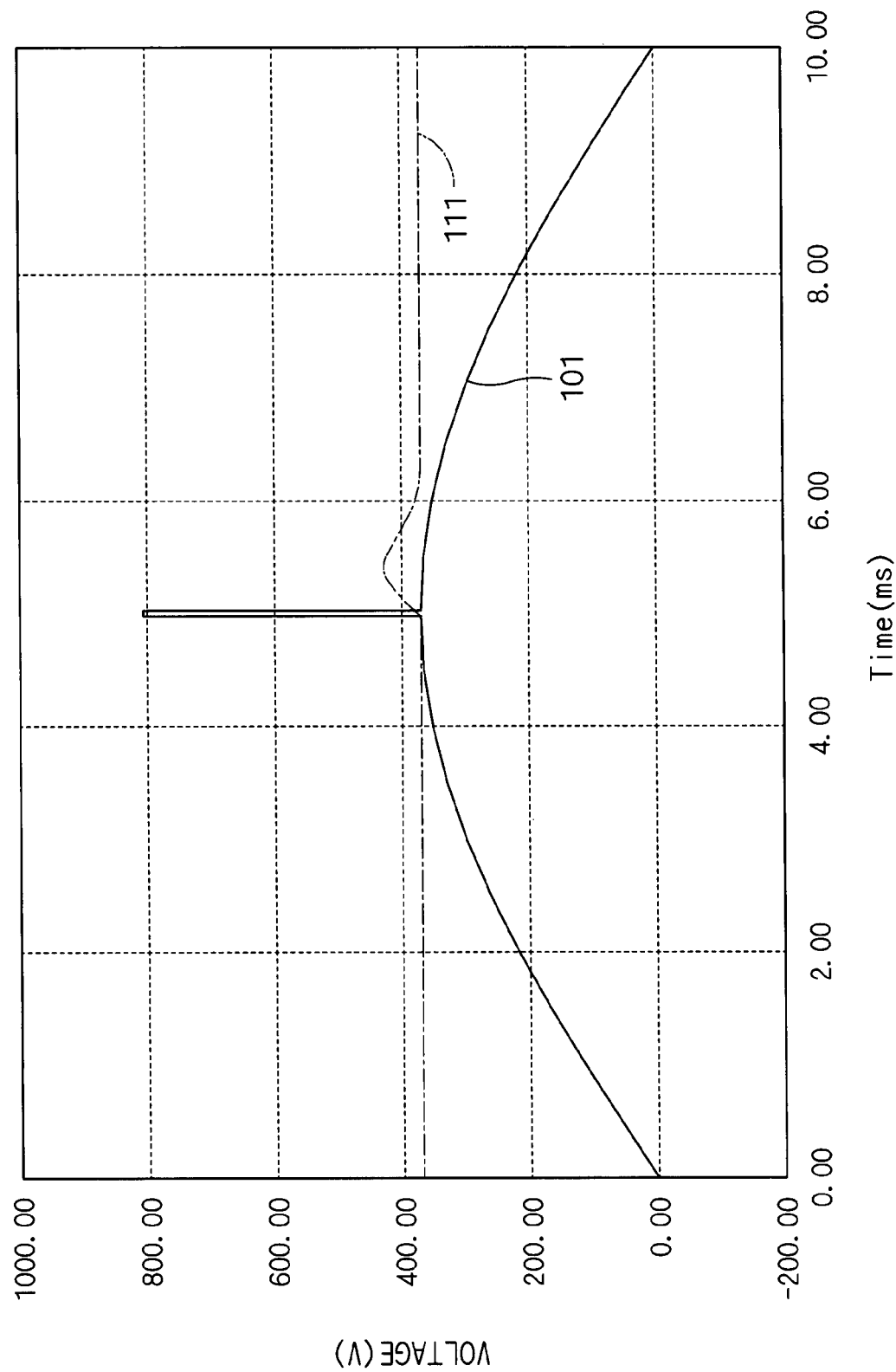
F I G. 1 9

US 8,395,874 B2

MULTIPHASE CURRENT SUPPLYING CIRCUIT, DRIVING APPARATUS, COMPRESSOR, AND AIR CONDITIONER

TECHNICAL FIELD

This invention relates to inverter techniques.

BACKGROUND ART

FIG. 14 is a circuit diagram illustrating the structure of a conventional multiphase current supplying circuit. A power supply system 1 includes an AC power supply 13, and supplies an AC voltage $V_{in}$ to a diode bridge 2. An inductance parasitic to the power supply system 1 is indicated as an inductor 12 connected to the AC power supply 13 in series.

The diode bridge 2 performs full-wave rectification on the AC voltage $V_{in}$. An intervening circuit 3 is interposed between the diode bridge 2 and an inverter 4, and output from the diode bridge 2 is supplied to the intervening circuit 3. The intervening circuit 3 includes a capacitor 31 whose both ends are supplied with output from the diode bridge 2. The capacitance C of the capacitor is small, and selectively set at 20 µF, for example. The capacitor 31 can be miniaturized by reducing its capacitance value C.

A rectified voltage $V_{dc}$ obtained at the both ends of the capacitor 31 is input to the inverter 4. In the inverter 4, switching of transistors serving as its switching elements of the inverter 4 is carried out based on switching signals $T_u$, $T_v$, $T_w$ obtained from a control circuit 6. As a result, three phase currents $i_u$, $i_v$, $i_w$ are supplied to a motor 5.

The control circuit 6 is supplied with a phase $\theta_1$ of the AC voltage $V_{in}$, the rectified voltage $V_{dc}$, the currents $i_u$, $i_v$, $i_w$, and a rotation position angle $\theta_m$ of a rotor of the motor 5. These respective quantities can be detected by well-known techniques. The control circuit 6 generates the switching signals $T_u$, $T_v$, $T_w$ based on these quantities.

A technique is known with a significantly small capacitance value C of the capacitor 31 and appropriately controlled switching signals $T_u$, $T_v$, $T_w$ based on the aforementioned respective quantities, to thereby carry out AC-AC conversion. Such switching control is herein referred to as capacitorless inverter control. The capacitorless inverter control allows for miniaturization of the overall circuit including a capacitor and an inverter and attains cost reduction as compared to an ordinary circuit that includes a smoothing circuit 301 or 302 (as shown in FIGS. 15 and 16, respectively) instead of the intervening circuit 3. While the smoothing circuit 301 adopts a smoothing large-capacitance capacitor CC and a power factor correction reactor LL, the capacitorless inverter control is capable of suppressing a power factor reduction on the power supply side without having to use such power factor correction reactor LL. And while the smoothing circuit 302 further includes a diode DD and a transistor QQ serving as a switching element to form a chopper circuit, the capacitorless inverter control is capable of suppressing power supply harmonics without having to use a chopper circuit.

The capacitorless inverter control is disclosed in a non-patent document 1, for example. In the non-patent document 1, an inverter is applied with a rectified voltage that pulsates widely with a frequency almost twice as much as that of a single-phase AC power supply. Yet appropriately controlled switching in the inverter allows three phase AC currents to be output. The non-patent document 1 indicates that, with respect to single-phase capacitorless inverter control, a power factor has a favorable value of 97% or more when a maximum value of both-end voltage of a capacitor is twice or more a minimum value thereof.

A patent document 1 is also cited as relevant to the present invention.

Patent document 1: Japanese Patent Application Laid-Open No. 2004-289985

Non-patent document 1: Isao Takahashi, "Inverter controlling method for a PM motor having a diode rectifying circuit with a high input power factor", The Institute of Electrical Engineers of Japan, National Conference in 2000, 4-149 (March 2000), p. 1591

DISCLOSURE OF INVENTION

It is conceivable that a lightning surge may be superimposed in the power supply system 1 of the multiphase current supplying circuit adopting the capacitorless inverter control as described above. Thus, it is desirable that lightning protection measures be taken for the power supply system 1.

FIG. 17 is a circuit diagram illustrating a structure in which a lightning arrester 7 is interposed between the power supply system 1 and the diode bridge 2 in the multiphase current supplying circuit shown in FIG. 14. The diode bridge 2 thus receives the AC voltage $V_{in}$ via the lightning arrester 7. The lightning arrester 7 functions as a peak-value suppressor for suppressing a surge voltage superimposed upon the AC voltage $V_{in}$.

Discussion is provided about damage to the inverter 4 when a lightning surge is superimposed in the power supply system 1. FIG. 18 is a graph showing a waveform 101 of the AC voltage $V_{in}$ and a waveform 110 of the rectified voltage $V_{dc}$. Herein, this simulation was performed for the case in which the AC power supply 13 generated a sinusoidal voltage having a frequency of 50 Hz and an effective value of 270 V, and a lightning surge of several thousands of volts having a width of 50 µs occurred in the vicinity of the peak of the sinusoidal voltage. The simulation was performed by adopting 230 µs for an inductance of $L_0$ of the parasitic inductor 12, but the value may actually vary depending on the power distribution circumstances of the area (the lengths of power lines, difference in leakage inductance of transformers). Twenty µF was adopted for the capacitance C of the capacitor 31. The assumption is that the AC voltage $V_{in}$ was clamped to 800 V by the lighting protector 7.

The waveform 110 of the rectified voltage $V_{dc}$ almost coincided with the waveform 101 of the AC voltage $V_{in}$ until immediately before the superimposition of the lightning surge, yet increased by a little more than 250 V after the superimposition to have a peak value exceeding 600 V. Then, the waveform 110 of the rectified voltage $V_{dc}$ coincided with the waveform 101 of the AC voltage $V_{in}$ again and decreased due to current flow to the inverter 4. After that, the rectified voltage $V_{dc}$ did not decrease as low as the AC voltage $V_{in}$ but had an almost constant minimum value. The capacitorless inverter performs control so that a maximum value (without considering the surge) of the rectified voltage $V_{dc}$ is twice or more a minimum value during operation, thus attaining operation with a high power factor.

When the lightning surge is applied during standby for operation of the inverter 4, current will not flow from the capacitor 31 to the inverter 4, causing the peak value exceeding 600 V to be held after the superimposition of the lightning surge.

Components having a breakdown voltage of about 600 V are often selected for the transistors used in the inverter circuit 4 for the purpose of its miniaturization. Therefore, the superimposition of a lightning surge upon the AC voltage $V_{in}$ as illustrated in FIG. 18 means a high possibility of the occurrence of serious damage to the inverter circuit 4 even with the reduction in that value by the lightning arrester 7.

However, this phenomenon does not inflict serious damage to the inverter circuit 4 when the capacitor 31 has a large capacitance C. FIG. 19 is a graph showing the waveform 101 of the AC voltage $V_{in}$ and a waveform 111 of the rectified voltage $V_{dc}$. Unlike the graph shown in FIG. 18, the graph shown in FIG. 19 indicates results of simulation that adopted 900 μF for the capacitance C of the capacitor 31. In this case, the AC voltage $V_{in}$ increases to 800V while the rectified voltage $V_{dc}$ only increases to about four hundred and several tens of volts. Because of the very large capacitance C, the rectified voltage $V_{dc}$ maintains almost the peak value of the AC voltage $V_{in}$ except in the vicinity of the surge occurrence.

This is attributed to the fact that as the capacitance C becomes smaller, a charging current $i_c$ flowing to the capacitor 31 via the diode bridge 2 due to a lightning surge causes a higher voltage to be generated at the capacitor 31. Put another way, it is required to suppress a voltage increase of the capacitor 31 due to a lightning surge in order to perform the capacitorless inverter control having the aforementioned advantages.

The present invention has been made in view of the above problems, and has an object to provide a technique capable of performing the capacitorless inverter control with significantly small capacitance of a capacitor in an intervening circuit even with the superimposition of a lightning surge.

In a first aspect of a multiphase current supplying circuit according to the present invention, the multiphase current supplying circuit includes: a peak-value suppressor (7) connected to an AC power supply (13) outputting an AC voltage ($V_{in}$), the peak-value suppressor suppressing a surge voltage superimposed upon the AC voltage; a group of diodes (2) receiving the AC voltage from the AC power supply via the peak-value suppressor to perform full-wave rectification on the AC voltage; a capacitor (31) receiving an output from the group of diodes; an inverter (4) receiving a both-end voltage ($V_{dc}$) of the capacitor to output multiphase AC currents ($i_u$, $i_v$, $i_w$); and an inductor (32, 8) connected to the capacitor in series. A maximum value of the both-end voltage is twice or more a minimum value of said both-end voltage.

In a second aspect of the multiphase current supplying circuit according to the present invention, the multiphase current supplying circuit includes: a peak-value suppressor (7) connected to an AC power supply (13) outputting an AC voltage ($V_{in}$), the means suppressing a surge voltage superimposed upon the AC voltage; a group of diodes (2) receiving the AC voltage from the AC power supply via the peak-value suppressor to perform full-wave rectification on the AC voltage; a capacitor (31) receiving an output from the group of diodes; a first bypass (33) connected to the capacitor in parallel; and an inverter (4) receiving a both-end voltage ($V_{dc}$) of the capacitor to output multiphase AC currents ($i_u$, $i_v$, $i_w$). A maximum value of the both-end voltage is twice or more a minimum value of said both-end voltage, and the first bypass includes a serial connection of a resistive element ($R_S$) and a capacitive element ($C_S$).

In a third aspect of the multiphase current supplying circuit according to the present invention, in the second aspect, the first bypass (33) further includes a diode ($D_S$) connected in series to the resistive element ($R_S$) and the capacitive element ($C_S$). A direction from an anode to a cathode of the diode coincides with a direction from a high potential side to a low potential side of the capacitor.

In a fourth aspect of the multiphase current supplying circuit according to the present invention, the multiphase current supplying circuit includes: a peak-value suppressor (7) connected to an AC power supply (13) outputting an AC voltage ($V_{in}$), the means suppressing a surge voltage superimposed upon the AC voltage; a group of diodes (2) receiving the AC voltage ($V_{in}$) from the AC power supply via the peak-value suppressor to perform full-wave rectification on the AC voltage; a capacitor (31) receiving output from the group of diodes; a first bypass (33) connected to the capacitor in parallel; and an inverter (4) receiving a both-end voltage ($V_{dc}$) of the capacitor to output multiphase AC currents ($i_u$, $i_v$, $i_w$). A maximum value of the both-end voltage is twice or more a minimum value of said both-end voltage f, the first bypass includes a serial connection of a diode ($D_S$) and a capacitive element ($C_S$), and a direction from an anode to a cathode of the diode coincides with a direction from a high potential side to a low potential side of the capacitor.

In a fifth aspect of the multiphase current supplying circuit according to the present invention, in one of the second to fourth aspects, the multiphase current supplying circuit further includes a second bypass (34) connected to the capacitor (31) in parallel. The second bypass conducts when the both-end voltage ($V_{dc}$) exceeds a first predetermined value, and non-conducts when the both-end voltage falls below a second predetermined value smaller than the first predetermined value.

In a sixth aspect of the multiphase current supplying circuit according to the present invention, in the fifth aspect, the second bypass (34) includes a resistor ($R_B$) and a switch (Q) connected in series to each other. The switch turns ON when the both-end voltage ($V_{dc}$) exceeds the first predetermined value, and turns OFF when the both-end voltage falls below the second predetermined value.

In a seventh aspect of the multiphase current supplying circuit according to the present invention, the multiphase current supplying circuit includes: a peak-value suppressor (7) connected to an AC power supply (13) outputting an AC voltage ($V_{in}$), the means suppressing a surge voltage superimposed upon the AC voltage; a group of diodes (2) receiving the AC voltage ($V_{in}$) from the AC power supply via the peak-value suppressor to perform full-wave rectification on the AC voltage; a capacitor (31) receiving output from the group of diodes; a first bypass (34) connected to the capacitor in parallel; and an inverter (4) receiving a both-end voltage ($V_{dc}$) of the capacitor to output multiphase AC currents ($i_u$, $i_v$, $i_w$). A maximum value of the both-end voltage is twice or more a minimum value of said both-end voltage, and the first bypass conducts when the both-end voltage ($V_{dc}$) exceeds a first predetermined value, and non-conducts when the both-end voltage falls below a second predetermined value smaller than the first predetermined value.

In an eighth aspect of the multiphase current supplying circuit according to the present invention, in the seventh aspect, the first bypass (34) includes a resistor ($R_B$) and a switch (Q) connected in series to each other, and the switch turns ON when the both-end voltage ($V_{dc}$) exceeds the first predetermined value, and turns OFF when the both-end voltage falls below the second predetermined value.

In a ninth aspect of the multiphase current supplying circuit according to the present invention, in one of the second to eighth aspects, the multiphase current supplying circuit further includes an inductor (32, 8) connected in series to a parallel connection of the capacitor (31) and a first bypass (33; 34).

According to the first to ninth aspects of the multiphase current supplying circuit of the present invention, the capacitorless inverter control with significantly small capacitance of the capacitor is performed even with the superimposition of a lightning surge.

According to the third and fourth aspects in particular, the diode allows a reduction in power consumption under normal operation.

According to the fifth and seventh aspects of the multiphase current supplying circuit of the present invention in particular, control is performed with the both-end voltage not exceeding the first predetermined value.

According to the sixth and eighth aspects of the multiphase current supplying circuit of the present invention in particular, the resistor is connected to the capacitor in parallel when the both-end voltage exceeds the first predetermined value, thus slowing charging speed to the capacitor and suppressing an increase in the both-end voltage.

A driving apparatus including the multiphase current supplying circuit according to one of the first to ninth aspects, and a motor supplied with the multiphase AC currents can be obtained.

A compressor including the above driving apparatus and driven by the driving apparatus can also be obtained.

An air conditioner including the above compressor, and cooling or heating air by adopting a coolant compressed by the compressor can also be attained.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a circuit diagram illustrating an intervening circuit 3aa of the driving apparatus according to a first variation of the first preferred embodiment of the present invention.

FIG. 6 is a circuit diagram illustrating the driving apparatus according to a second variation of the first preferred embodiment of the present invention.

FIG. 9 is a graph showing an operation according to a first variation of the second preferred embodiment of the present invention.

FIG. 10 is a circuit diagram illustrating an intervening circuit 3c of the driving apparatus according to a second variation of the second preferred embodiment of the present invention.

FIG. 11 is a graph showing an operation according to the second variation of the second preferred embodiment of the present invention.

FIGS. 12 and 13 are circuit diagrams illustrating parts of the multiphase current supplying circuit according to a third preferred embodiment of the present invention.

FIGS. 15 and 16 are circuit diagrams illustrating the structure of a conventional smoothing circuit.

FIG. 17 is a circuit diagram illustrating the structure of a multiphase current supplying circuit including the lightning arrester 7.

FIGS. 18 and 19 are graphs showing operations of the multiphase current supplying circuit including the lightning arrester 7.

BEST MODES FOR CARRYING OUT THE INVENTION

First Preferred Embodiment

Figure 1:
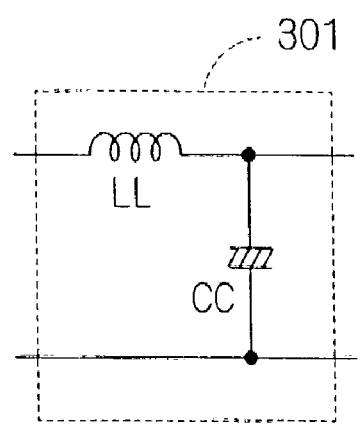
FIG. 1 is a circuit diagram illustrating a driving apparatus according to a first preferred embodiment of the present invention.
Figure 1:
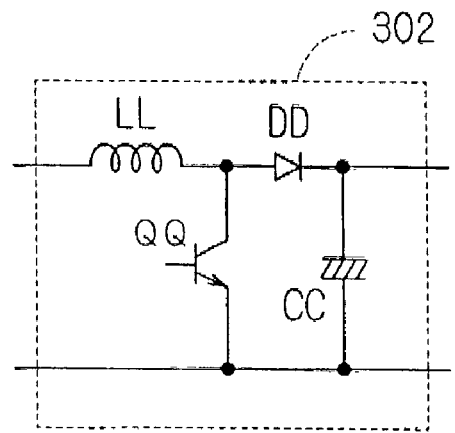

FIG. 1 is a circuit diagram illustrating a driving apparatus according to a first preferred embodiment of the present invention. The driving apparatus includes a motor 5 serving as a driving part, and a multiphase current supplying circuit that supplies multiphase currents to the motor 5.

The multiphase current supplying circuit includes a diode bridge 2, an intervening circuit 3a, an inverter 4, a control circuit 6, and a lightning arrester 7. The diode bridge 2 is connected to a single-phase AC power supply system 1 via the lightning arrester 7, and performs full-wave rectification on a single-phase AC voltage $V_{in}$. The parasitic inductance of the power supply system 1 as mentioned above is indicated as an inductor 12 connected to an AC power supply 13 in series. Two hundred and thirty µH is adopted for a value $L_0$ of the parasitic inductance.

The diode bridge 2 has the full-wave rectification function, and performs full-wave rectification on the AC voltage $V_{in}$ to input it to the intervening circuit 3a. The intervening circuit 3a includes a capacitor 31 and an inductor 32, and is constituted by a choke input type low-pass filter. More specifically, one end of the inductor 32 and one end of the capacitor 31 are connected, output from the diode bridge 2 is received between the other end of the inductor 32 and the other end of the capacitor 31, and a rectified voltage $V_{dc}$ which is both-end voltage of the capacitor 31 is output to the inverter 4.

The capacitor 31 has a capacitance value C set so that the rectified voltage $V_{dc}$ pulsates widely with a frequency twice as much as a frequency of the AC voltage $V_{in}$, and a maximum value of the rectified voltage $V_{dc}$ is twice or more a minimum value thereof. By way of example, the capacitance value C is set to 20 µF, and inductance L of the inductor 32 is set to 300 µH, respectively. These values are significantly small as compared to the capacitance value (e.g. 900 µF) and inductance (e.g. 6 mH) adopted in the smoothing circuits 301 and 302 (see FIGS. 15 and 16, respectively).

The inverter 4 supplies three phase currents $i_u$, $i_v$, $i_w$ to the motor 5. The currents $i_u$, $i_v$, $i_w$ correspond to a U-phase, a V-phase, and a W-phase, respectively. The inverter 4 includes three transistors (upper arm side transistors) each having a collector connected to the one end of the capacitor 31, and three transistors (lower arm side transistors) each having an emitter connected to the other end of the capacitor 31. Each of the upper arm side transistors forms a pair with each of the lower arm side transistors on a phase-by-phase basis. The emitter of an upper arm side transistor and the collector of a lower arm side transistor forming the pair are connected at a connection node, and the currents $i_u$, $i_v$, $i_w$ are output from the connection nodes. The on/off switching of each of the upper arm side transistors and lower arm side transistors is controlled based on switching signals $T_u$, $T_v$, $T_w$ from the control circuit 6. The switching signals $T_u$, $T_v$, $T_w$ correspond to a U-phase, a V-phase, and a W-phase, respectively.

To pass regenerative current from the motor 5, each of the upper arm side transistors and lower arm side transistors is provided with a freewheeling diode having an anode connected to the emitter and a cathode connected to the collector.

The control circuit 6 is supplied with a phase $\theta_1$ of the AC voltage $V_{in}$, the rectified voltage $V_{dc}$ generated at both ends of the capacitor 31, the currents $i_u$, $i_v$, $i_w$, and a rotation position angle (mechanical angle) $\theta_m$ of a rotor of the motor 5. These respective quantities can be detected by well-known techniques. The control circuit 6 also receives a command value $\omega_m^*$ for rotation angular speed (angular speed of the mechanical angle) of the motor 5, and a current phase command $\beta^*$. The control circuit 6 generates the switching signals $T_u$, $T_v$, $T_w$ based on these.

Figure 2:
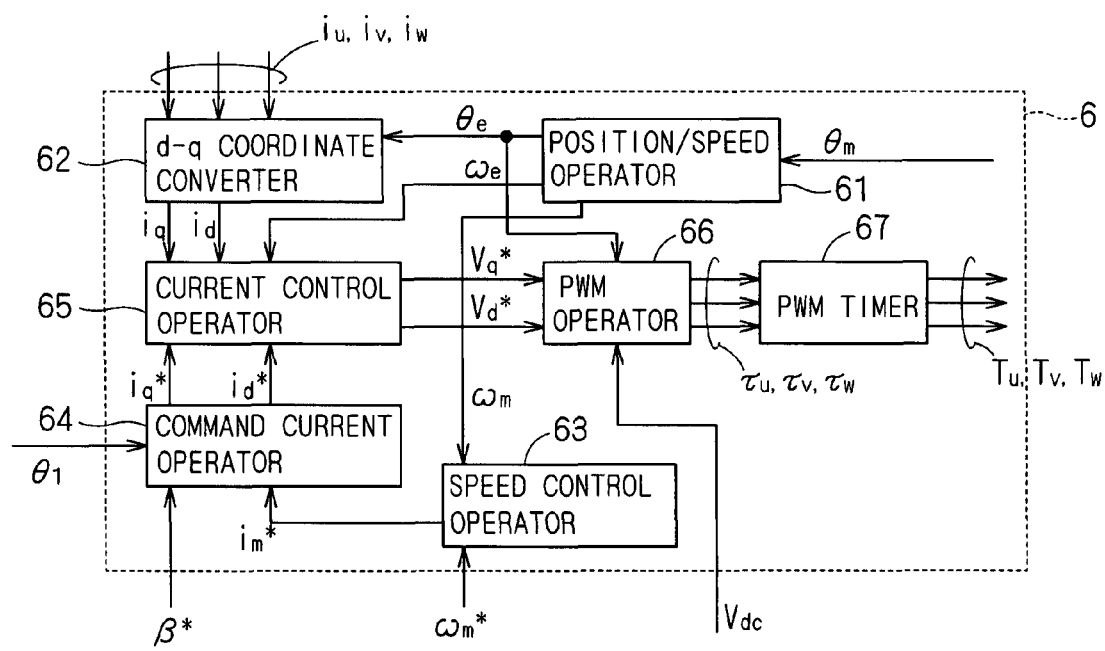
FIG. 2 is a block diagram illustrating a detailed structure of a control circuit 6.

FIG. 2 is a block diagram illustrating a detailed structure of the control circuit 6. The control circuit 6 includes a position/speed operator 61, a d-q coordinate converter 62, a speed control operator 63, a command current operator 64, a current control operator 65, a PWM (Pulse Width Modulation) operator 66, and a PWM timer 67, which have the functions of performing operations set out below.

The position/speed operator 61 obtains and outputs a rotation angle (electrical angle $\theta_e$) and rotation angular speed (angular speed $\omega_e$ of the electrical angle and angular speed $\omega_m$ of the mechanical angle) of the rotor of the motor 5 based on the mechanical angle $\theta_m$ of the rotor of the motor 5. The d-q coordinate converter 62 obtains what are called d-axis current $i_d$ and q-axis current $i_q$ based on an equation (1) from the currents $i_u$, $i_v$, $i_w$ and the electrical angle $\theta_e$ of the motor 5. The so-called d-axis current is magnetic flux current, a current component that produces magnetic flux in a main magnetic flux direction established within the motor 5, and the so-called q-axis current is torque current that controls torque directly with a 90-degree phase advance relative to the d-axis current.

[Numeral 1]

$$\begin{bmatrix} i_d \\ i_q \end{bmatrix} = \sqrt{\frac{2}{3}} \begin{bmatrix} \cos\theta_e & \cos(\theta_e - 2\pi/3) & \cos(\theta_e + 2\pi/3) \\ -\sin\theta_e & -\sin(\theta_e - 2\pi/3) & -\sin(\theta_e + 2\pi/3) \end{bmatrix} \begin{bmatrix} i_u \\ i_v \\ i_w \end{bmatrix} \quad (1)$$

The speed control operator 63 performs proportionate/integral operations (PI operation) based on the command value $\omega_m^*$ for angular speed of the mechanical angle and the angular speed $\omega_m$ of the mechanical angle of the motor 5, to output a motor current command $i_m^*$. Further, the command current operator 64 receives the motor current command $i_m^*$, the current phase command $\beta^*$, and the phase $\theta_1$, to output a d-axis current command $i_d^*$ and a q-axis current command $i_q^*$ based on an equation (2). These currents fluctuate widely with a frequency ripple twice as much as that of the AC voltage $V_{in}$.

[Numeral 2]

$$\begin{bmatrix} i_d^* \\ i_q^* \end{bmatrix} = i_m^* |\sin\theta_1| \begin{bmatrix} -\sin\beta^* \\ \cos\beta^* \end{bmatrix} \quad (2)$$

The current control operator 65 receives the d-axis current $i_d$ and the q-axis current $i_q$, the d-axis current command $i_d^*$ and the q-axis current command $i_q^*$, and the angular speed $\omega_e$ of the electrical angle, to output a d-axis voltage command $v_d^*$ and a q-axis voltage command $v_q^*$ based on an equation (3). In the equation (3), $K_d$ and $K_q$ represent proportional gain of the d-axis and the q-axis, respectively, $L_d$ and $L_q$ represent motor inductance of the d-axis and the q-axis, respectively, and $\phi_a$ represents a motor counter electromotive voltage constant.

[Numeral 3]

$$\begin{bmatrix} v_d^* \\ v_q^* \end{bmatrix} = \begin{bmatrix} -K_d & -\omega_e L_d \\ \omega_e L_d & -K_q \end{bmatrix} \begin{bmatrix} i_d \\ i_q \end{bmatrix} + \begin{bmatrix} K_d i_d^* \\ K_q i_q^* + \omega_e \phi_a \end{bmatrix} \quad (3)$$

The PWM operator 66 receives the rotation angle (electrical angle) $\theta_e$ of the rotor and the d-axis voltage command $v_d^*$ and the q-axis voltage command $v_q^*$, to generate phase voltage commands $v_u^*$, $v_v^*$, $v_w^*$ based on an equation (4).

[Numeral 4]

$$\begin{bmatrix} v_u^* \\ v_v^* \\ v_w^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \\ \cos(\theta_e + 2\pi/3) & -\sin(\theta_e + 2\pi/3) \end{bmatrix} \begin{bmatrix} v_d^* \\ v_q^* \end{bmatrix} \quad (4)$$

The PWM operator 66 also receives the rectified voltage $V_{dc}$, and uses this voltage and the phase voltage commands $v_u^*$, $v_v^*$, $v_w^*$, to obtain ON time $\tau_j$ (j=u, v, w) of the upper arm side transistor of each phase based on an equation (5). A carrier period $T_c$ is introduced to the equation (5). The value of the ON time $\tau_j$ is forcibly changed to $T_c$ when exceeding $T_c$, and is forcibly changed to zero when being below zero.

[Numeral 5]

$$\tau_j = \frac{v_j^* + 0.5 * v_{dc}}{v_{dc}} T_c \quad (5)$$

The PWM timer 67 stores the ON times $\tau_u$, $\tau_v$, $\tau_w$ for each carrier period $T_c$, and supplies the inverter 4 with the switching signals $T_u$, $T_v$, $T_w$ for turning the transistor of each phase on/off in response to the stored time.

Figure 3:
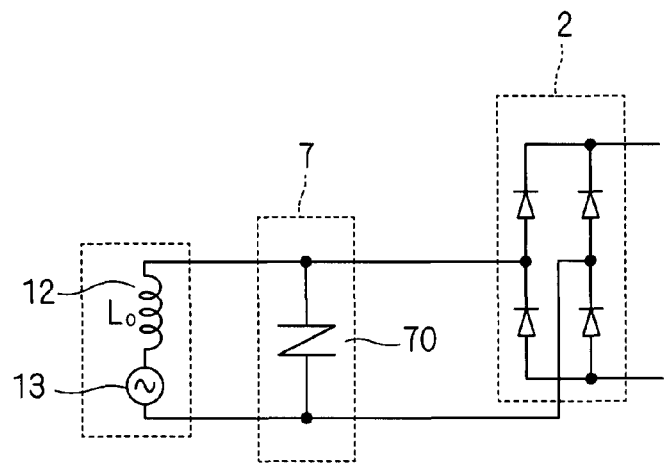
FIG. 3 is a circuit diagram illustrating the structure of a lightning arrester 7 together with a power supply system 1 and a diode bridge 2.

FIG. 3 is a circuit diagram illustrating an adoptable structure for the lightning arrester 7, which is shown together with the power supply system 1 and the diode bridge 2. In FIG. 3, a pair of input lines of the diode bridge 2 is connected to each other by a protection element 70 included in the lightning arrester 7. A varistor may be adopted for the protection element 70.

Figure 4:
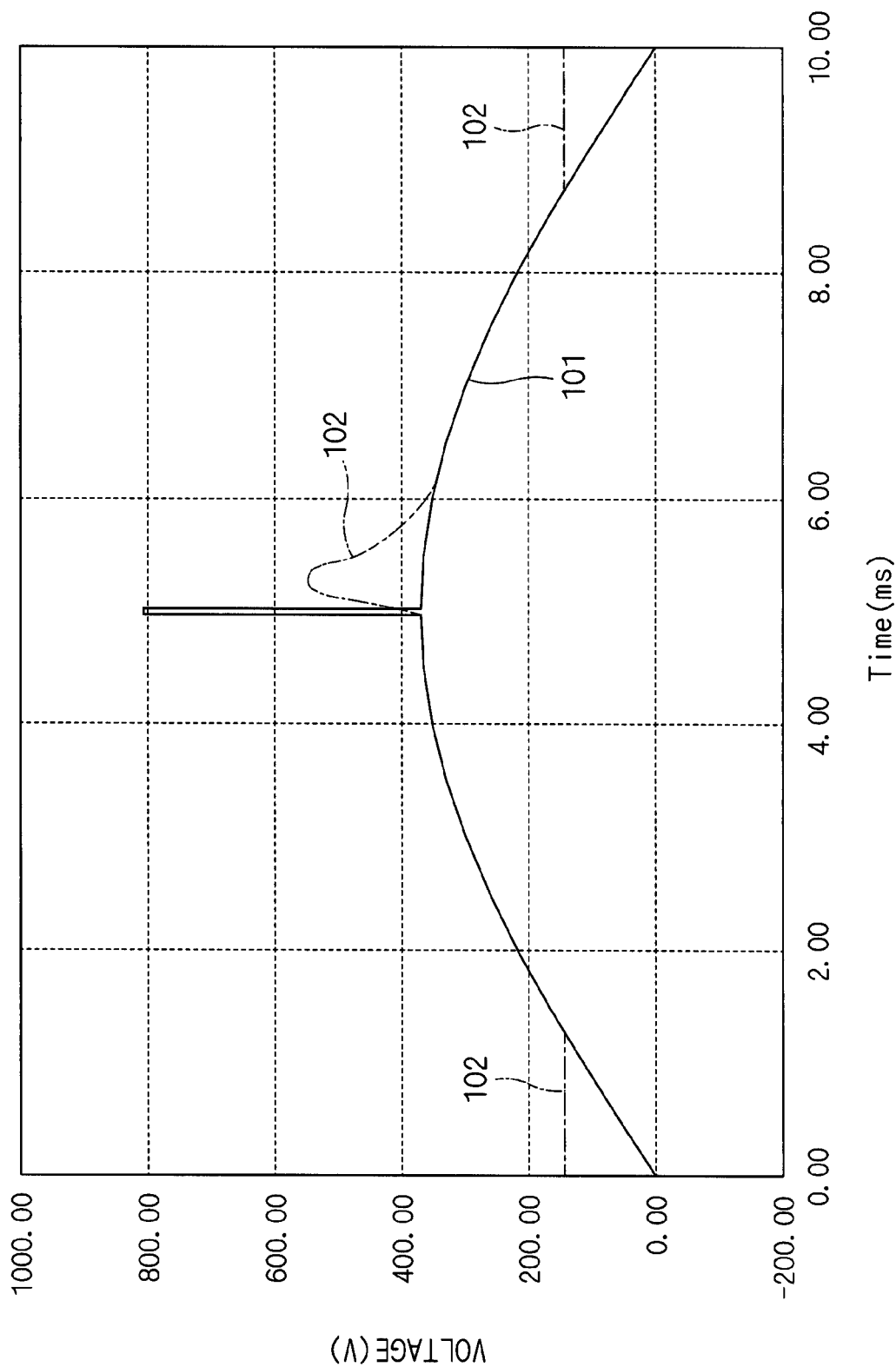
FIG. 4 is a graph showing an operation according to the first preferred embodiment of the present invention.

FIG. 4 is a graph showing a waveform 101 of the AC voltage $V_{in}$ and a waveform 102 of the rectified voltage $V_{dc}$ in the multiphase current supplying circuit illustrated in FIG. 1. Like the simulation shown in FIG. 18, this simulation was performed for the case in which the AC power supply 13 generates a sinusoidal voltage having a frequency of 50 Hz and an effective value of 270 V, a lightning surge of several thousands of volts having a width of 50 μs occurs in the vicinity of a peak, and the AC voltage $V_{in}$ is clamped to 800 V by the lighting protector 7.

The waveform 102 of the rectified voltage $V_{dc}$ does not reach 600 V after the superimposition of the lightning surge. This is attributed to the fact that a charging current $i_c$ flowing from the diode bridge 2 to the capacitor 31, which goes through the inductor 32, is prevented from changing steeply by the inductor 32.

A desirable value of the inductance L of the inductor 32 is estimated as set out below. In this regard, current does not flow from the capacitor 31 to the inverter 4 when the inverter 4 is on standby for operation, or when the inverter 4 is in operation but a lightning surge is applied during the output of a line-to-line voltage of 0 (when all three of the upper arm side transistors are ON, or when all three of the lower arm side transistors are ON). An estimate of a desirable value of the inductance L in such state is thus a safer estimate as compared to when the inverter 4 is in operation. Therefore, the following is based on the assumption that current does no flow to the inverter 4.

Assuming that $L_S$ represents the sum of the inductance L of the inductor 32 and the inductance $L_0$ of the inductor 12, and $V_2$ represents power supply voltage, a relationship of an equation (6) holds based on the assumption, since the charging current $i_c$ flowing to the capacitor 31 goes through the inductor 12 and the inductor 32. The amount of charge q (time integration of current) is introduced to the last equation. The power supply voltage is $V_2$ is rectified by the diode bridge 2, and its absolute value is applied to the capacitor 31.

[Numeral 6]

$$V_2 = Ls\frac{di_c}{dt} + \frac{1}{C}\int i_c dt \qquad (6)$$
$$= Ls\frac{d^2}{dt^2}q + \frac{1}{C}q$$

Since a maximum value $V_M$ of the power supply voltage $V_2$ has been applied to the capacitor 31 before the occurrence of the lightning surge, the charging current $i_c$ does not flow, and the voltage of the capacitor 31 is $V_M$.

When a solution is obtained with the assumption that the voltage of the lightning surge after being clamped is $V_S$, that $V_2=V_S$ in the equation (6), and further that initial values are adopted so that $i_c=0$ and $q=C\cdot V_M$, the voltage $V_{dc}=V_D$ of the capacitor 31 and the charging current $i_c=i_{cc}$ immediately after the completion of the lightning surge ($\Delta T$ after the occurrence of the lightning surge) are expressed as equations (7) and (8), respectively.

[Numeral 7]

$$V_D = V_S - (V_S - V_M)\cos\frac{\Delta T}{\sqrt{LsC}} \qquad (7)$$

[Numeral 8]

$$i_{cc} = \sqrt{\frac{C}{Ls}}(V_S - V_M)\sin\frac{\Delta T}{\sqrt{LsC}} \qquad (8)$$

The pulse width $\Delta T$ of the lightning surge is assumed to be very narrow as compared to the period of the AC voltage $V_{in}$. Thus the power supply voltage $V_2$ before and after the occurrence of the lightning surge can be approximated to have the maximum value $V_M$ (without considering the surge) as indicated by the waveform 101. A solution is obtained again with $V_2=V_M$, and $i_c=i_{cc}$ and $q=C\cdot V_D$ as initial values in the equation (6). The voltage $V_{dc}$ of the capacitor 31, which keeps increasing while the charging current $i_c$ flows due to the effect of the inductor, becomes maximum when the charging current $i_c$ becomes zero. The maximum value $V_N$ is expressed as an equation (9).

[Numeral 9]

$$V_N = V_M + \sqrt{(V_D - V_M)^2 + icc^2\frac{Ls}{C}} \qquad (9)$$

Protection against breakdown due to the lightning surge can be obtained when the maximum value $V_N$ is not more than the breakdown voltage of the inverter 4.

Using the equations (7) and (8) in the equation (9), the inductance $L_S$ is obtained by an equation (10).

[Numeral 10]

$$Ls = \frac{1}{C}\left[\frac{\Delta T}{\cos^{-1}\left\{1 - \frac{1}{2}\left(\frac{V_N - V_M}{V_S - V_M}\right)^2\right\}}\right]^2 \qquad (10)$$

Using C=20 μF, $V_S$=800V, $V_N$=600V, $V_M=2^{0.5}\cdot 270$V, and $\Delta T$=50 μs as specific numerical values, the inductance $L_S$ is obtained to be about 450 μH from the equation (9). Since $V_N$ decreases as the inductance $L_S$ increases based on the equation (10), the inverter 4 can be protected against breakdown due to the lightning surge when the inductance $L_S$ is not less than about 450 μH.

An LC resonant frequency can be obtained by transforming the equation (10). When $V_S$=800 V, $V_N$=600 V, $V_M=2^{0.5}\cdot 270$ V, and $\Delta T$=50 μs are adopted, a resonant frequency is 1681 Hz, which is of $34^{th}$ order with respect to a power supply frequency of 50 Hz, and $28^{th}$ order with respect to a power supply frequency of 60 Hz. Put another way, protection against breakdown due to the lightning surge can be obtained by selecting $L_S$ to be lower than these orders.

In the data used for the simulation shown in FIG. 4, the inductance $L_0$ of the inductor 12 is set to 230 μH and the inductance L of the inductor 32 is set to 300 μH so that an inductance is greater than $L_S$ obtained from the equation (10). FIG. 4 shows the simulation results when the inverter 4 is in operation but a lightning surge was applied during the output of a line-to-line voltage of 0 (when all three of the upper arm side transistors are ON, or when all three of the lower arm side transistors are ON). FIG. 8, FIG. 9, FIG. 11 and FIG. 19 show simulation results under similar circumstances.

Thus, the above described effects can be obtained by connecting an inductor to the capacitor 31 in series when viewed from the power supply system 1. FIG. 5 is a circuit diagram illustrating an intervening circuit of the driving apparatus according to a first variation of the first preferred embodiment of the present invention. An intervening circuit 3aa adoptable for the intervening circuit 3a includes the capacitor 31 and two inductors 32a and 32b. The inductors 32a and 32b are connected to the capacitor 31 in series when viewed from the power supply system 1 while being arranged opposite to each other.

FIG. 6 is a circuit diagram illustrating the driving apparatus according to a second variation of the first preferred embodiment of the present invention. An intervening circuit 3 includes the capacitor 31, but does not include the inductor 32. Instead of the inductor 32, an inductor 8 is interposed between the lightning arrester 7 and the diode bridge 2. The inductor 8 is connected to the capacitor 31 in series.

It should be considered that the charging current $i_c$ flowing to the capacitor 31, which goes through the inductors 32a and 32b in the first variation, and through the inductor 8 in the second variation, respectively, is prevented from changing steeply by these inductors. Therefore, an increase in the rectified voltage $V_{dc}$ can be suppressed in these variations as well.

It is of course allowed to provide the inductor 8 between the diode bridge 2 and the lightning arrester 7, and the inductor 32 in the intervening circuit 3a (or the inductors 32a and 32b in the intervening circuit 3aa), respectively, as these two inductors 8 and 32 (or three inductors 8, 32a and 32b) are also connected to the capacitor 31 in series.

With such divided inductors, it is again preferable that the sum of their inductances and the system inductance $L_0$ be not less than the inductance $L_S$ obtained form the equation (10).

As described above, the capacitorless inverter control with a significantly small capacitance value C of the capacitor 31 can be performed even with the superimposition of a lightning surge. Moreover, the inductor 32 can be made smaller in size than the reactor LL adopted in the smoothing circuits 301 and 302, thus not seriously hampering the miniaturization of the intervening circuit.

Second Preferred Embodiment

In the first preferred embodiment, a steep change in the charging current $i_c$ from the diode bridge 2 to the capacitor 31 is suppressed by connecting an inductor to the capacitor 31 in series. Alternatively, a bypass may be provided in parallel with the capacitor 31 to discharge excess current to the bypass.

Figure 7:
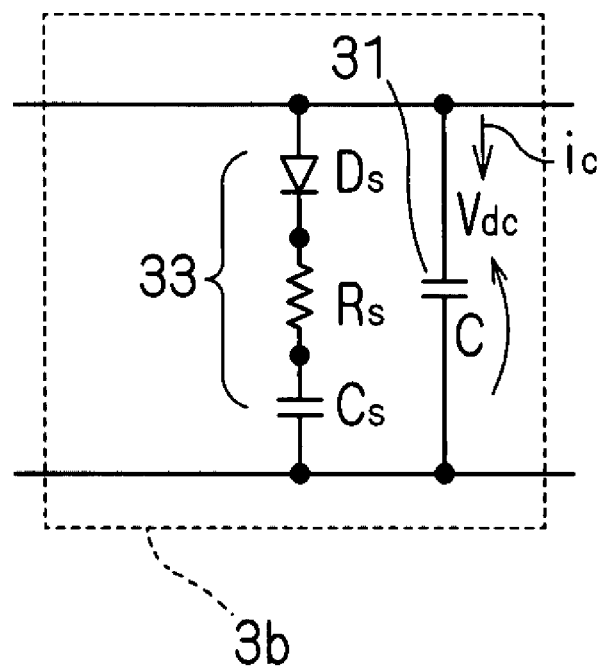
FIG. 7 is a circuit diagram illustrating the structure of an intervening circuit 3b adopted in a second preferred embodiment of the present invention.

FIG. 7 is a circuit diagram illustrating the structure of an intervening circuit 3b having such a bypass 33. The structure shown in FIG. 1 is again adopted in this embodiment, except that the intervening circuit 3a is replaced by the intervening circuit 3b shown in FIG. 7.

The intervening circuit 3b includes the capacitor 31 whose both ends are supplied with output from the diode bridge 2, and outputs the rectified voltage $V_{dc}$ generated at the both ends of the capacitor 31 to the inverter 4. The intervening circuit 3b further includes the bypass 33 connected to the capacitor 31 in parallel.

In the bypass 33, a diode $D_S$, a resistor $R_S$ and a capacitor $C_S$ are connected in series, and a direction from an anode to a cathode of the diode $D_S$ coincides with a direction from a high potential side to a low potential side of the capacitor 31. FIG. 7 is an illustration of a case where the anode of the diode $D_S$ is connected to one end on the high potential side of the capacitor 31, the cathode of the diode $D_S$ to one end of the resistor $R_S$, the other end of the resistor $R_S$ to one end of the capacitor $C_S$, and the other end of the capacitor $C_S$ to one end on the low potential side of the capacitor 31, respectively. The order of the diode $D_S$, the resistor $R_S$ and the capacitor $C_S$ forming a serial circuit may be changed.

Figure 8:
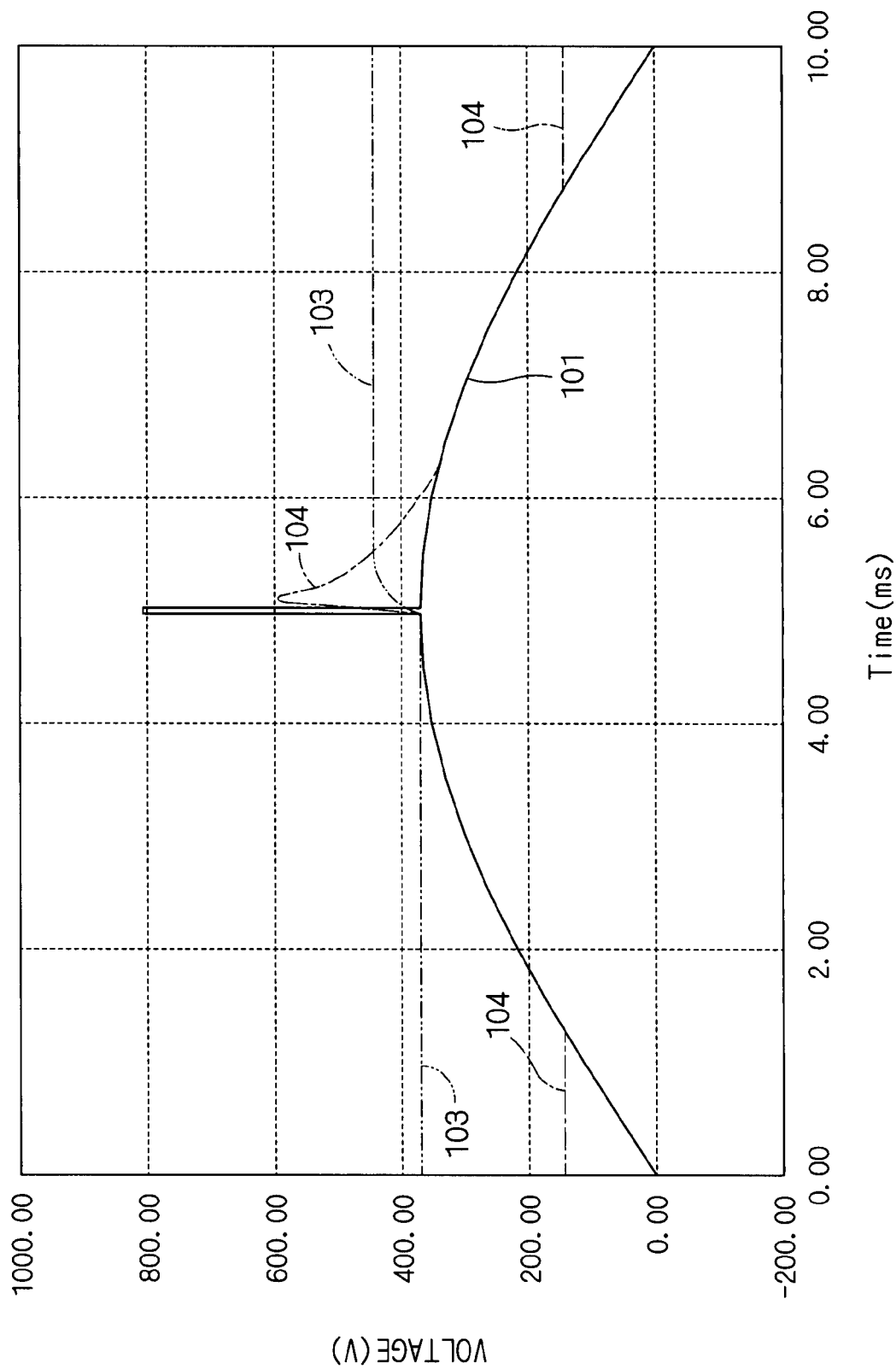
FIG. 8 is a graph showing an operation according to the second preferred embodiment of the present invention.
Figure 14:
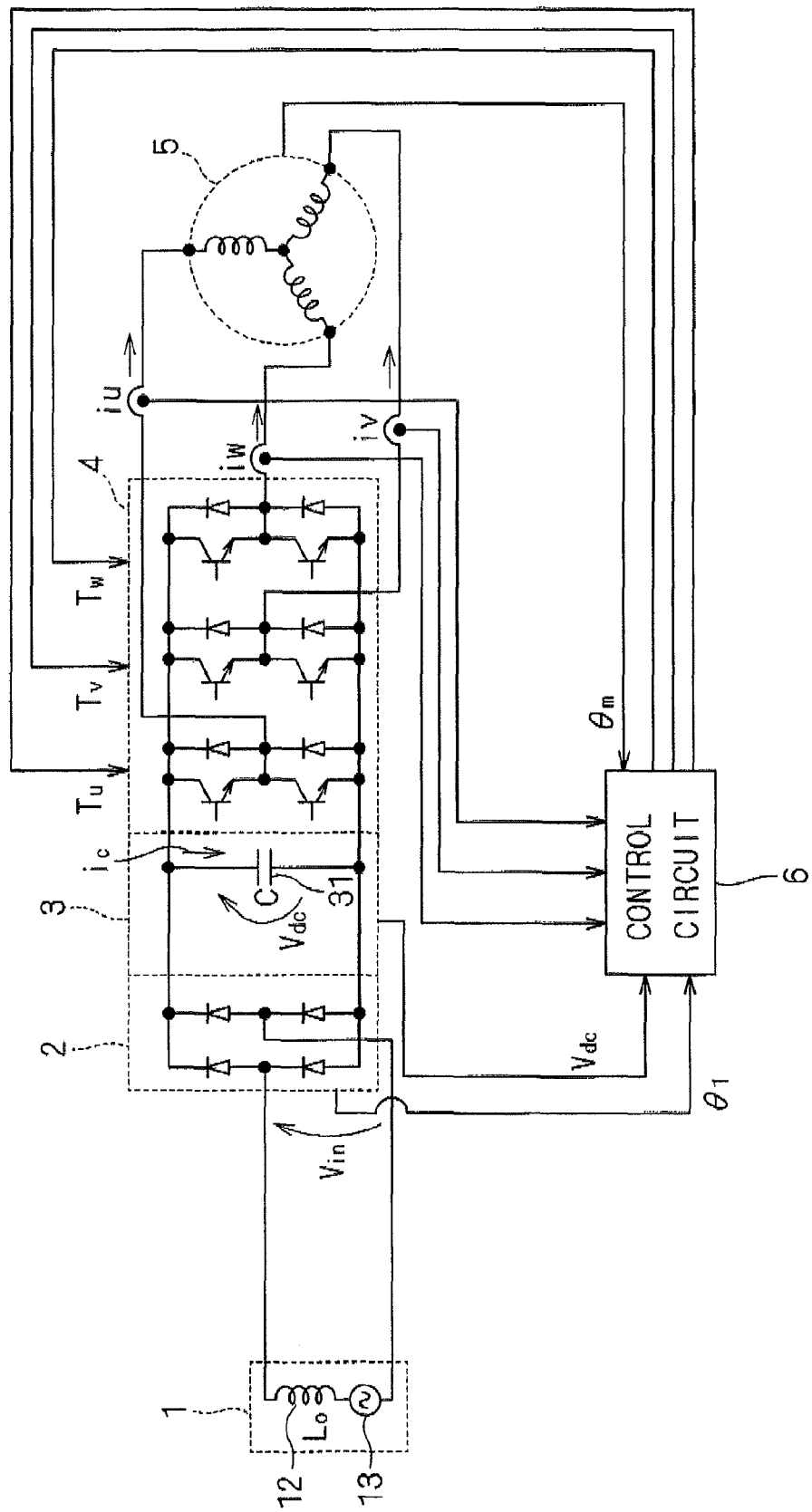
FIG. 14 is a circuit diagram illustrating the structure of a conventional multiphase current supplying circuit.

FIG. 8 is a graph showing a waveform 101 of the AC voltage $V_{in}$, a waveform 103 of both-end voltage of the capacitor $C_S$, and a waveform 104 of the rectified voltage $V_{dc}$. The simulation conditions except the provision of the bypass 33 are identical to those for the simulation that resulted in the graph shown in FIG. 18. As data of the bypass 33, the resistor $R_S$ has a resistance of 10Ω, and the capacitor $C_S$ has a capacitance of 100 μF. Such bypass 33 can be reduced in size as compared to the capacitor 31 having a capacitance of 900 μF adopted in the simulation that resulted in the graph shown in FIG. 19.

The waveform 104 of the rectified voltage $V_{dc}$ almost coincides with the waveform 101 of the AC voltage $V_{in}$ until immediately before the occurrence of the lightning surge. Meanwhile, the waveform 103 of the both-end voltage of the capacitor $C_S$ has been charged to a peak vale ($2^{0.5} \cdot 270$ V) of the AC voltage $V_{in}$ due to the earlier operation. But when the lightning surge occurs and the AC voltage $V_{in}$ increases steeply toward 800 V, not only the capacitor 31 but also the capacitor $C_S$ is charged via the diode $D_S$. The current to charge the capacitor $C_S$ flows via the resistor $R_S$. Accordingly, the rectified voltage $V_{dc}$ indicated by the waveform 104 increases more steeply than the both-end voltage of the capacitor $C_S$ indicated by the waveform 103 does. Note that the charging current $i_c$ in this embodiment can be made smaller than the charging current $i_c$ in the intervening circuit 3 (FIG. 15) by the charging current flowing through the capacitor $C_S$. This prevents the rectified voltage $V_{dc}$ from reaching 600 V.

Then, due to current flow to the inverter 4, the rectified voltage $V_{dc}$ almost coincides with the both-end voltage of the capacitor $C_S$ temporarily, but coincides with the AC voltage $V_{in}$ again and decreases. After that, the rectified voltage $V_{dc}$ does not decrease as low as the AC voltage $V_{in}$ but has an almost constant minimum value. The capacitorless inverter performs control so that a maximum value (without considering the surge) of the rectified voltage $V_{dc}$ is twice or more a minimum value during operation, thus attaining operation with a high power factor.

On the other hand, the both-end voltage of the capacitor $C_S$ coincides with the rectified voltage $V_{dc}$ and then holds the voltage thereafter. This is so because potential on the cathode side of the diode $D_S$ based on the both-end voltage of the capacitor $C_S$ is higher than potential on the anode side of the diode $D_S$ based on the rectified voltage $V_{dc}$.

The diode $D_S$ is not a necessity in view of the above operation. But the rectified voltage $V_{dc}$ pulsates widely as mentioned above in the capacitorless inverter control. Thus the both-end voltage of the capacitor $C_S$ also pulsates widely without the diode $D_S$ in the bypass 33. This leads to charge to and discharge from of the capacitor $C_S$ under normal operation, which generates loss in the resistor $R_S$. To reduce power consumption at the resistor $R_S$ under normal operation, therefore, it is preferable that the diode $D_S$ be provided in the bypass 33. The case of using the inductors 8, 32, 32a and 32b as described in the first preferred embodiment, where such consumption is not generated naturally, is more advantageous than when the diode $D_S$ is not provided in the bypass 33 in that respect.

Meanwhile, when the resistor $R_S$ is not provided in the bypass 33, the capacitor $C_S$ is charged quickly, which allows an increase in the amount of current flowing through the bypass 33. As a result, an increase in the rectified voltage $V_{dc}$ can be suppressed even more effectively. FIG. 9 is a graph showing an operation according to a first variation of the second preferred embodiment of the present invention, where the bypass 33 includes only the capacitor $C_S$ and the diode $D_S$ by removing the resistor $R_S$. A waveform 107 indicates the both-end voltage of the capacitor $C_S$, and a waveform 108 indicates the rectified voltage $V_{dc}$, respectively.

The both-end voltage of the capacitor $C_S$ in the first variation is higher than that when the resistor $R_S$ is provided. It is preferable that the bypass 33 be provided with the resistor $R_S$ also capable of suppressing abnormal increase in the both-end voltage of the capacitor $C_S$ due to a transient phenomenon at power activation, and in the rectified voltage $V_{dc}$ by extension.

Although not considered in the simulation, internal loss occurs in the capacitor $C_S$. Thus when the diode $D_S$ is connected, the both-end voltage of the capacitor $C_S$ that rose after the application of the lightning surge decreases with a time constant due to the internal loss of the capacitor $C_S$, and eventually coincides with a maximum value (without considering the surge) of the rectified voltage $V_{dc}$. Discharge resistors and the like may be connected to both ends of the capacitor $C_S$ to reduce the time constant.

As described above, the capacitor 31 apparently increases in capacitance e at the occurrence of a lightning surge, and functions with the original capacitance C under normal operation. Accordingly, the capacitorless inverter control with a significantly small capacitance C of the capacitor 31 can be performed even with the superimposition of a lightning surge. Further, the capacitance of the capacitor $C_S$ may be made smaller than the capacitance (e.g. 900 µF) of the capacitor CC adopted in the conventional structures illustrated in FIG. 15 and FIG. 16. Considering that the capacitor $C_S$ performs the operation of branching the charging current to the capacitor 31 to suppress a voltage increase, the capacitance of the capacitor $C_S$ may be specifically made as small as about 100 µF, for example, which is larger than that of the capacitor 31 yet smaller than that of the capacitor CC. The capacitor $C_S$ will thus not seriously hamper the miniaturization of the intervening circuit.

FIG. 10 is a circuit diagram illustrating an intervening circuit of the driving apparatus according to a second variation of the second preferred embodiment of the present invention. An intervening circuit 3c has a structure that additionally includes the inductor 32 with respect to the intervening circuit 3b. More specifically, the inductor 32 is connected in series to the parallel connection of the capacitor 31 and the bypass 33. By adopting the intervening circuit 3c as the intervening circuit 3a shown in FIG. 1, the function of the inductor 32 described in the first preferred embodiment and the function of the bypass 33 described in the second preferred embodiment are combined together. Therefore, a voltage increase in the rectified voltage $V_{dc}$ at the occurrence of a lightning surge can be suppressed even more effectively.

FIG. 11 is a graph showing a waveform 101 of the AC voltage $V_{in}$, a waveform 105 of the both-end voltage of the capacitor $C_S$, and a waveform 106 of the rectified voltage $V_{dc}$. The already mentioned values were adopted for the inductance L of the inductor 32, and data of the bypass 33. It is shown that a peak value of the rectified voltage $V_{dc}$ at the occurrence of the lightning surge is small as compared to the waveform 102 (FIG. 4) adopting only the inductor 32, or the waveform 104 (FIG. 8) adopting only the bypass 33.

It is of course allowed to further provide the inductor 8 between the diode bridge 2 and the lightning arrester 7 as described in the first preferred embodiment. Alternatively, the inductor 8 may be provided between the diode bridge 2 and the lightning arrester 7 while adopting the intervening circuit 3b instead of the intervening circuit 3c.

Third Preferred Embodiment

FIGS. 12 and 13 are circuit diagrams illustrating part of the multiphase current supplying circuit according to a third preferred embodiment of the present invention. Although the diode bridge 2, the inverter 4, and the lightning arrester 7 are omitted, the circuit is configured in a similar way to FIG. 1. In this embodiment, the intervening circuit 3a shown in FIG. 1 is replaced by an intervening circuit 3d (see FIG. 12) or an intervening circuit 3e (see FIG. 13).

The intervening circuit 3d has a structure in which a bypass 34 is additionally connected to the capacitor 31 in parallel in the intervening circuit 3a described in the first preferred embodiment with reference to FIG. 1, and the intervening circuit 3e has a structure in which the bypass 34 is additionally connected to the capacitor 31 in parallel in the intervening circuit 3b described in the second preferred embodiment with reference to FIG. 7. The bypass 34 includes a serial connection of a transistor Q serving as a switching element and a resistor $R_B$.

The control circuit 6 supplies a bias voltage CNQ to the base of the transistor Q based on the rectified voltage $V_{dc}$. The transistor Q is turned on when the rectified voltage $V_{dc}$ exceeds a first predetermined value, and turned off when the rectified voltage $V_{dc}$ falls below a second predetermined value (which is smaller than the first predetermined value).

In this way the resistor $R_B$ gets connected to the capacitor 31 in parallel when the rectified voltage $V_{dc}$ exceeds the first predetermined value and increases, thus slowing charging speed to the capacitor 31 and suppressing an increase in the rectified voltage $V_{dc}$. Moreover, the parallel connection to the capacitor 31 gets canceled when the rectified voltage $V_{dc}$ falls below the second predetermined value, thus not compromising the operation of the capacitorless inverter under normal operation.

It is of course allowed to additionally connect the bypass 34 to the capacitor 31 in parallel in the intervening circuit 3 shown in FIG. 6 as the second variation of the first preferred embodiment. Alternatively, it is allowed to additionally connect the bypass 34 to the capacitor 31 in parallel in the intervening circuits 3b and 3c shown in FIGS. 7 and 10 as the second preferred embodiment and its second variation, respectively. It is of course allowed to modify these cases by not providing the resistor $R_S$ and the diode $D_S$ (short circuit removal).

Still alternatively, the rectified voltage $V_{dc}$ may be clamped by the bypass 34 without providing the inductor 32 (short circuit removal) in the intervening circuit 3d shown in FIG. 12.

For the bypass 34 to operate effectively in response to a fast varying lightning surge, the transistor Q needs to operate at high speed. A drive circuit and a lightning surge detecting circuit that are appropriate to the operation are also needed. A power supply for activating those drive circuit and lightning surge detecting circuit needs to be secured even during standby for operation of the inverter 4. In terms of structural complexity, therefore, it will be more advantageous to adopt the bypass 33.

Application

The driving apparatus including the multiphase current supplying circuit and the motor 5 supplied with the multiphase AC currents $i_u$, $i_v$, $i_w$ according to the present invention is capable of driving a compressor, for example. Such compressor is included in an air conditioner, for example. The air conditioner adopts a coolant for air cooling or air heating, and the coolant is compressed by the compressor.

While the invention has been shown and described in detail, the foregoing description is in all aspects illustrative and not restrictive. It is therefore understood that numerous modifications and variations can be devised without departing from the scope of the invention.

The invention claimed is:

1. A method for designing a multiphase current supplying circuit comprising: a peak-value suppressor connected to an AC power supply outputting an AC voltage, said peak-value suppressor suppressing a surge voltage superimposed upon said AC voltage; a group of diodes receiving said AC voltage from said AC power supply via said peak-value suppressor to perform full-wave rectification on said AC voltage; a capacitor receiving an output from said group of diodes; an inverter receiving a both-end voltage of said capacitor to output multiphase AC currents; and an inductor connected in series to a circuit configuration of said inverter and said capacitor, wherein a maximum value of said both-end voltage is twice or more a minimum value of said both-end voltage, said method comprising:

designing inductance of said inductor such that sum of inductance parasitic in said AC power supply and said inductance of said inductor becomes not less than Ls determined by the following equation:

$$L_S = \frac{1}{C}\left[\frac{\Delta T}{\cos^{-1}\left\{1 - \frac{1}{2}\left(\frac{V_N - V_M}{V_S - V_M}\right)^2\right\}}\right]^2$$

wherein C: capacity of said capacitor, ΔT: pulse width of lightning surge, $V_N$: maximum voltage of both ends of said capacitor, $V_M$: maximum value of said AC voltage ($V_{in}$), $V_s$: voltage of lightning surge after clamping.

2. A method for designing a driving apparatus comprising:
designing the multiphase current supplying circuit according to claim 1; and
supplying a motor with said multiphase AC currents.

3. A method for designing a compressor comprising:
designing the driving apparatus according to claim 2,
said compressor being driven by said driving apparatus.

4. A method for designing an air conditioner comprising:
designing the compressor according to claim 3,
said air conditioner cooling or heating air by adopting a coolant, said coolant being compressed by said compressor.

5. A multiphase current supplying circuit comprising:
a peak-value suppressor connected to an AC power supply outputting an AC voltage, said peak-value suppressor suppressing a surge voltage superimposed upon said AC voltage;
a group of diodes receiving said AC voltage from said AC power supply via said peak-value suppressor to perform full-wave rectification on said AC voltage;
a capacitor receiving an output from said group of diodes;
a first bypass connected to said capacitor in parallel; and
an inverter receiving a both-end voltage of said capacitor to output multiphase AC currents, wherein
a maximum value of said both-end voltage is twice or more a minimum value of said both-end voltage, and
said first bypass includes a serial connection of a resistive element and a capacitive element.

6. The multiphase current supplying circuit according to claim 5, wherein
said first bypass further includes a diode connected in series to said resistive element and said capacitive element, and
a direction from an anode to a cathode of said diode coincides with a direction from a high potential side to a low potential side of said capacitor.

7. The multiphase current supplying circuit according to claim 6, further comprising:
a second bypass connected to said capacitor in parallel, said second bypass conducting when said both-end voltage exceeds a first predetermined value, and non-conducting when said both-end voltage falls below a second predetermined value smaller than said first predetermined value.

8. The multiphase current supplying circuit according to claim 7, wherein said second bypass includes a resistor and a switch connected in series to each other, said switch turning ON when said both-end voltage exceeds said first predetermined value, and turning OFF when said both-end voltage falls below said second predetermined value.

9. The multiphase current supplying circuit according to claim 6, further comprising:
an inductor connected in series to a parallel connection of said capacitor and said first bypass.

10. The multiphase current supplying circuit according to claim 5, further comprising:
a second bypass connected to said capacitor in parallel, said second bypass conducting when said both-end voltage exceeds a first predetermined value, and non-conducting when said both-end voltage falls below a second predetermined value smaller than said first predetermined value.

11. The multiphase current supplying circuit according to claim 10, wherein said second bypass includes a resistor and a switch connected in series to each other, said switch turning ON when said both-end voltage exceeds said first predetermined value, and turning OFF when said both-end voltage falls below said second predetermined value.

12. The multiphase current supplying circuit according to claim 5, further comprising:
an inductor connected in series to a parallel connection of said capacitor and said first bypass.

13. A multiphase current supplying circuit comprising:
a peak-value suppressor connected to an AC power supply outputting an AC voltage, said peak-value suppressor suppressing a surge voltage superimposed upon said AC voltage;
a group of diodes receiving said AC voltage from said AC power supply via said peak-value suppressor to perform full-wave rectification on said AC voltage;
a capacitor receiving output from said group of diodes;
a first bypass connected to said capacitor in parallel; and
an inverter receiving a both-end voltage of said capacitor to output multiphase AC currents, wherein
a maximum value of said both-end voltage is twice or more a minimum value of said both-end voltage,
said first bypass includes a serial connection of a diode and a capacitive element, and
a direction from an anode to a cathode of said diode coincides with a direction from a high potential side to a low potential side of said capacitor.

14. The multiphase current supplying circuit according to claim 13, further comprising:
a second bypass connected to said capacitor in parallel, said second bypass conducting when said both-end voltage exceeds a first predetermined value, and non-conducting when said both-end voltage falls below a second predetermined value smaller than said first predetermined value.

15. The multiphase current supplying circuit according to claim 14, wherein said second bypass includes a resistor and a switch connected in series to each other, said switch turning ON when said both-end voltage exceeds said first predetermined value, and turning OFF when said both-end voltage falls below said second predetermined value.

16. The multiphase current supplying circuit according to claim 13, further comprising:
an inductor connected in series to a parallel connection of said capacitor and said first bypass.

* * * * *